(12) United States Patent
Fang et al.

(10) Patent No.: US 12,243,143 B2
(45) Date of Patent: Mar. 4, 2025

(54) METHOD, APPARATUS, ELECTRONIC DEVICE AND STORAGE MEDIUM FOR DISPLAYING A MOVEMENT AND A PRESET ANIMATION OF A TARGET OBJECT

(71) Applicant: Beijing Zitiao Network Technology Co., Ltd., Beijing (CN)

(72) Inventors: Longji Fang, Beijing (CN); Jing Huang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/590,743

(22) Filed: Feb. 28, 2024

(65) Prior Publication Data

US 2024/0203018 A1    Jun. 20, 2024

Related U.S. Application Data

(63) Continuation of application No. PCT/CN2022/114378, filed on Aug. 24, 2022.

(30) Foreign Application Priority Data

Aug. 30, 2021    (CN) .......................... 202111007301.3

(51) Int. Cl.
*G06T 13/40*    (2011.01)
*G06T 17/00*    (2006.01)

(52) U.S. Cl.
CPC .............. *G06T 13/40* (2013.01); *G06T 17/00* (2013.01)

(58) Field of Classification Search
CPC ......... G06T 13/40; G06T 17/00; G06T 11/00; G06T 19/006
See application file for complete search history.

(56) References Cited

U.S. PATENT DOCUMENTS 7,386,799 B1 *    6/2008    Clanton .................. A63F 13/12
                                                                  715/861
10,551,993 B1 *    2/2020    Sanocki .................. G06F 3/017
(Continued)

FOREIGN PATENT DOCUMENTS

CN    109200586 A    1/2019
CN    111228791 A    6/2020
(Continued)

OTHER PUBLICATIONS

International Patent Application No. PCT/CN2022/114378; Int'l Search Report; dated Nov. 17, 2022; 2 pages.
(Continued)

*Primary Examiner* — Yu Chen
(74) *Attorney, Agent, or Firm* — BakerHostetler

(57) ABSTRACT

Embodiments of the disclosure discloses a method, apparatus, electronic device and storage medium for displaying an object. The method includes: presenting a real scene image on a first interface, and determining three-dimensional spatial information of a real scene based on the real scene image; collected configuring motion trajectory parameters of a target object based on the three-dimensional spatial information of the real scene, and generating the target object moving in the real scene on the first interface based on the motion trajectory parameters; and in response to determining that a first control in the first interface aims at the target object, playing a preset animation of the target object.

19 Claims, 5 Drawing Sheets

(56) References Cited

U.S. PATENT DOCUMENTS

| | | | | |
|---|---|---|---|---|
| 2014/0002351 | A1* | 1/2014 | Nakayama | H04N 13/366 |
| | | | | 345/156 |
| 2018/0341386 | A1* | 11/2018 | Inomata | A63F 13/211 |
| 2019/0025595 | A1* | 1/2019 | Fukuda | G06F 3/0346 |
| 2019/0099671 | A1* | 4/2019 | Kojima | G06V 40/28 |
| 2019/0324528 | A1* | 10/2019 | Williams | G06F 18/40 |
| 2020/0275089 | A1* | 8/2020 | Lee | G06F 3/017 |
| 2021/0220742 | A1* | 7/2021 | Yu | A63F 13/533 |
| 2022/0032194 | A1 | 2/2022 | Wei et al. | |
| 2022/0047947 | A1* | 2/2022 | Kmita | A63F 13/537 |
| 2022/0283631 | A1* | 9/2022 | Peng | G06V 20/20 |
| 2023/0019216 | A1* | 1/2023 | Liu | H04N 21/4781 |
| 2023/0030619 | A1* | 2/2023 | Qiao | A63F 13/5372 |

FOREIGN PATENT DOCUMENTS

| | | |
|---|---|---|
| CN | 111672126 A | 9/2020 |
| CN | 112148187 A | 12/2020 |
| CN | 112148188 A | 12/2020 |
| CN | 113262482 A | 8/2021 |

OTHER PUBLICATIONS

European Patent Application No. 22863245.1; Extended Search Report; dated Nov. 11, 2024; 127 pages.

* cited by examiner

METHOD, APPARATUS, ELECTRONIC DEVICE AND STORAGE MEDIUM FOR DISPLAYING A MOVEMENT AND A PRESET ANIMATION OF A TARGET OBJECT

This application is a continuation of International Patent Application No. PCT/CN2022/114378, filed on Aug. 24, 2022, which claims the benefit of Chinese Patent Application No. 202111007301.3 filed on Aug. 30, 2021, both of which are incorporated herein by reference in their entireties.

FIELD

The present disclosure relates to the field of computer technology, for example, to a method, apparatus, electronic device and storage medium for displaying an object.

BACKGROUND

Nowadays, some multimedia applications can beautify images, videos and other data based on virtual props. In related art, virtual props are usually superimposed and rendered on images, videos and other data to achieve beautification effects. The shortcomings of the related art at least include that the interactive mode of virtual props is single, which cannot meet user requests.

SUMMARY

The present disclosure provides a method, apparatus, electronic device and storage medium for displaying an object, which can realize interactive interface display, so that the gameplay of the virtual props becomes richer, and to some extent meeting user requests.

In a first aspect, embodiments of the present disclosure provide an object display method, including:
  presenting a collected real scene image on a first interface, and determining three-dimensional spatial information of a real scene based on the real scene image;
  configuring motion trajectory parameters of a target object based on the three-dimensional spatial information of the real scene, and generating the target object moving in the real scene on the first interface based on the motion trajectory parameters; and
  in response to determining that a first control in the first interface aims at the target object, playing a preset animation of the target object.

In a second aspect, embodiments of the present disclosure further provide an apparatus for playing an object, including:
  a real scene processing module configured to present a collected real scene image on a first interface, and determining three-dimensional spatial information of a real scene based on the real scene image;
  an object generating module configured to configure motion trajectory parameters of a target object based on the three-dimensional spatial information of the real scene, and generate the target object moving in the real scene on the first interface based on the motion trajectory parameters; and the object interaction module configured to play a preset animation of the target object in response to determining that the first control in the first interface aims at the target object.

In a third aspect, embodiments of the present disclosure further provide an electronic device, the electronic device including:
  one or more processors; and
  a storage device configured to store one or more programs,
  when the one or more programs are executed by the one or more processors, the one or more processors implement the method for displaying an object according to any of the embodiments of the present disclosure.

In a fourth aspect, embodiments of the present disclosure further provide a storage medium including computer-executable instructions, the computer-executable instructions, when executed by a computer processor, are configured to perform the method for displaying an object according to any of the embodiments of the present disclosure.

DETAILED DESCRIPTION

Figure 1:
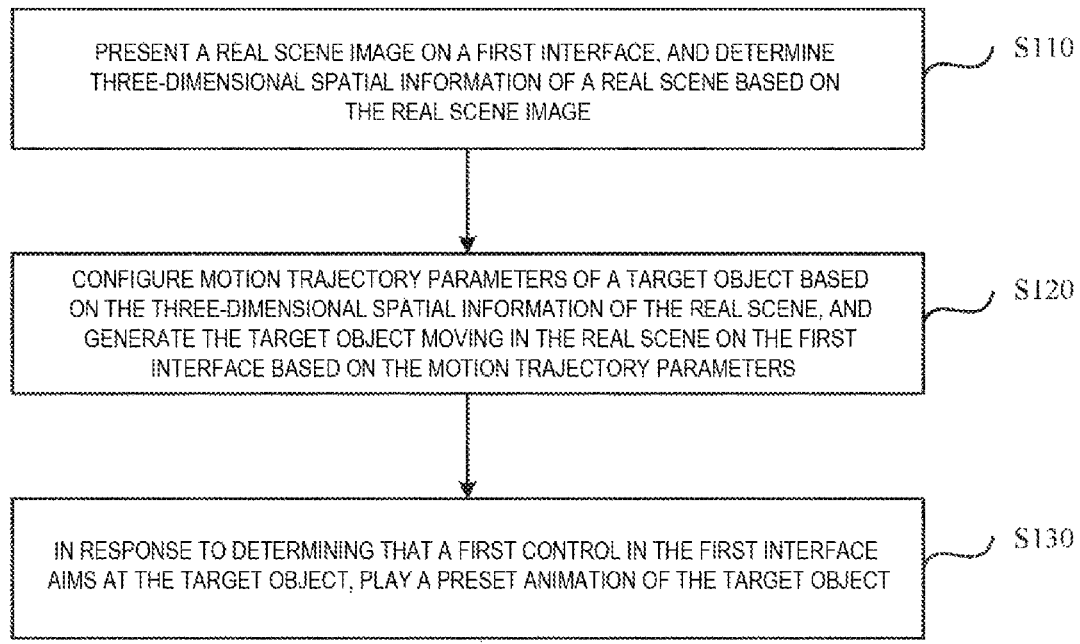
FIG. 1 is a schematic flowchart of an object display method according to an embodiment of the present disclosure.

The following will describe the embodiments of the present disclosure in more detail with reference to the accompanying drawings. Although some embodiments of the present disclosure are shown in the drawings, it should be understood that the present disclosure can be implemented in various forms and should not be construed as limited to the embodiments set forth herein. On the contrary, these embodiments are provided for a more thorough and complete understanding of the present disclosure. It should be understood that the drawings and embodiments of the present disclosure are provided for illustrative purposes only and are not intended to limit the scope of protection of the present disclosure.

It should be understood that a plurality of steps described in the method implementation of this disclosure can be executed in different orders and/or in parallel. In addition; the method implementation can include additional steps and/or the steps as shown may be omitted. The scope of this disclosure is not limited in this regard.

The term "including" and its variations as used herein are non-exclusive inclusion, i.e. "including but not limited to". The term "based on" means "at least partially based on". The term "one embodiment" means "at least one embodiment"; the term "another embodiment" means "at least one additional embodiment"; and the term "some embodiments" means "at least some embodiments". Relevant definitions of other terms will be given in the following description.

It should be noted that the concepts of "first" and "second" mentioned in this disclosure are only used to distinguish different apparatuses, modules, or units, but are not used to limit the order or interdependence of the functions performed by these apparatuses, modules, or units.

It should be noted that the modifications of "one" and "a plurality of" mentioned in this disclosure are illustrative but not limiting. Those skilled in the art should understand that unless otherwise indicated in the context, they should be understood as "one or more".

FIG. 1 is a schematic flowchart of an object display method provided by the embodiment of the present disclosure. The present disclosure is applicable to the case where interactive props are generated based on that real scenes are displayed on the interface. The method can be performed by an object display apparatus, which can be implemented in the form of software and/or hardware. The apparatus can be integrated into software applications (such as multimedia applications), and can be installed in electronic devices together with software applications, such as installed in mobile phones, computers, and other electronic devices.

As shown in FIG. 1, the object display method provided by embodiments of the present disclosure includes:

S110, presenting a collected real scene image on a first interface, and determining three-dimensional spatial information of a real scene according to the real scene image.

In an embodiment of the present disclosure, the apparatus for performing the object display method may be integrated in a software application, such as an integrated long/short video application, an image beautification application, and the like, and the software application may be installed and run in an electronic device. After the software application is started, the first interface in the application may be rendered by the object display apparatus.

During a process of rendering the first interface, the object display apparatus may call the image collecting capability provided by the electronic device to collect real scene images, such as calling the front/rear camera equipped on the electronic device to collect real scene images. The real scene image can be understood as an image of real environment in which the electronic device is located. When the object display apparatus collects a current real scene image, the collected real scene image is presented in the first interface, for example, the real scene image can be presented in full screen in the first interface, or the real scene image can be presented in the real scene presentation area in the first interface. By generating and displaying virtual props based on the real scene image, the effect of augmented reality (AR) can be presented, enhancing the visual experience.

While presenting the real scene image in the first interface, the real scene image can also be processed to obtain three-dimensional spatial information of the real scene. The three-dimensional spatial information of the real scene can include but is not limited to the depth information of a plurality of points in the real scene representing distances of the points from the camera, and normal vector information of the local plane where the plurality of points are located. The real scene image can be processed based on a deep learning model to obtain three-dimensional spatial information of the real scene, and the deep learning model can include but is not limited to Multi-view Stereo Net (MVS Net), Learned Stereoscopic Vision Machines (LSM), etc.

S120, configuring motion trajectory parameters of a target object according to the three-dimensional spatial information of the real scene, and generating the target object moving in the real scene on the first interface based on the motion trajectory parameters.

The three-dimensional spatial information of the real scene can be regarded as the three-dimensional spatial information of a plurality of points in the real scene, and the three-dimensional spatial information of the plurality of points can be obtained by steps of transforming between coordinate matrices of world coordinates and camera coordinates and transforming between coordinate matrices of camera coordinates and the interface pixel coordinates, so as to obtain position information of corresponding pixel points on the interface. It can be considered that the correspondence between the plurality of points in the real scene and pixel points on the interface can be determined based on the predetermined transformation steps.

The target object can be considered as a virtual prop that can interact with the user, such as a wild monster prop with a style such as a mosquito, a moth, and an elf. The target object can be a three-dimensional model or a two-dimensional model, such as the target object can be a three-dimensional model, thereby improving the visual effect and enabling users to have immersive interactive experience.

Configuring the motion trajectory parameters of the target object according to the three-dimensional spatial information of the real scene may include configuring the three-dimensional spatial information of a plurality of trajectory points in the motion trajectory of the target object according to the three-dimensional spatial information of a plurality of points in the real scene. For example, the three-dimensional spatial information of the plurality of trajectory points in the motion trajectory of the target object can be used as a limiting range for the motion trajectory, and the three-dimensional spatial information of a plurality of trajectory points in the motion trajectory of the target object can be configured within the limiting range.

Configuring the three-dimensional spatial information of the plurality of points in the motion trajectory can be achieved, for example, by configuring motion mode parameters. The motion mode parameters can be random motion, regular motion, etc., and during the processes of random motion and regular motion, hovering, slight shaking from left to right, and other behavioral actions may be included, thereby improving the stereoscopic effect of the model when the target object is a three-dimensional model. Furthermore, the three-dimensional spatial information of a plurality of points in the motion trajectory can be configured according to the motion mode parameters. For example, if the motion mode parameter is horizontal and right uniform motion, the three-dimensional spatial information of the plurality of points of the target object within a motion cycle can be configured at a certain speed.

After configuring the motion trajectory parameters of the target object, the target object that performs three-dimensional spatial motion in the real scene can be generated by simulation based on the motion trajectory parameters. Furthermore, the target object can be drawn into the first interface based on the correspondence between the plurality of points in the real scene and pixel points on the interface, that is, the target object is generated in the first interface, and the effect of the target object moving in the three-dimensional space of the real scene can be presented. For example, presenting the target object in the first interface may include forward/backward/left/right/up/down movement, jump animation, and flying, etc. in the real scene.

By configuring motion trajectory parameters according to three-dimensional spatial information, the effect of the target object moving in the real scene can be presented, thereby achieving an augmented reality effect.

In some exemplary implementations, the configuring motion trajectory parameters of a target object according to the three-dimensional spatial information of the real scene, and generating the target object moving in the real scene on the first interface based on the motion trajectory parameters, includes:

determining a world coordinate system to which the three-dimensional spatial information of the real scene belongs, and configuring the motion trajectory parameters of the target object in the world coordinate system; determining an angle of view for collection for the real scene image in the world coordinate system; and generating the target object on the first interface according to the angle of view for collection and the motion trajectory parameters; wherein the target object is presented within the first interface with an effect of moving in the real scene.

The three-dimensional spatial information of the plurality of points in the real scene determined by the object display apparatus generally includes spatial information of the plurality of points in a preset and unified world coordinate system. Configuring the motion trajectory parameters of the target object in the world coordinate system can include: taking the world coordinate system to which the plurality of points in the real scene belong as a reference, and configure the three-dimensional spatial information of a plurality of trajectory points in the motion trajectory of the target object by using a spatial range consisted of the plurality of points as a limiting range for the motion of the target object.

In the above-mentioned world coordinate system, the three-dimensional spatial information of the camera in the electronic device can also be set, and the range of the real scene collected by the camera can be considered as the angle of view for collection. It can be considered that the real scene image collected through this angle of view is the real scene image presented in the first interface. The angle of view for collection may change with the posture of the electronic device, that is, the real scene image presented in the first interface will change as well. For example, when the electronic device turns horizontally to the right, the angle of view for collection rotates accordingly, and the collected real scene image changes accordingly.

When determining the current angle of view for collection and the current three-dimensional spatial position in the motion trajectory parameters of the target object, pixel positions of the target object in the first interface can be determined based on the correspondence between a plurality of points in the real scene and pixel points in the interface, so that the target object can be generated in the first interface. Moreover, the target object may be presented in the first interface with an effect of moving in the real scene.

Figure 2:
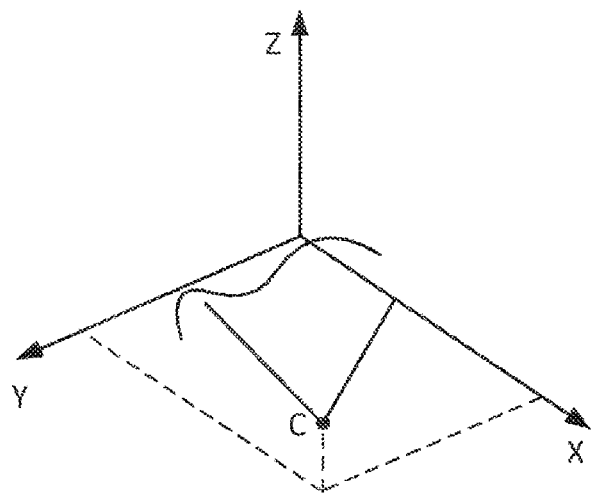
FIG. 2 is a schematic diagram of the world coordinate system in an object display method provided by an embodiment of the present disclosure.

As an example, FIG. 2 is a schematic diagram of the world coordinate system in an object display method provided by the embodiment of the present disclosure. Referring to FIG. 2, the coordinate system XYZ shown in FIG. 2 can be regarded as the world coordinate system; point C can be regarded as the three-dimensional spatial information of the camera in the electronic device, and the collection area of the camera (shown in FIG. 2 as two straight lines with C as the vertex) can be regarded as the angle of view for collection; and the curve can be regarded as the motion trajectory of the target object. According to the current angle of view for collection and the current three-dimensional spatial position in the motion trajectory parameters of the target object, the target object can be displayed on the first interface to present the motion effect of the target object in the real scene.

In some exemplary implementations, the target object includes at least one type; and configuring the motion trajectory parameters of the target object includes: determining a current target object to be generated according to a generation rule of each type of target object, and configuring the motion trajectory parameters of the current target object to be generated.

There is at least one type of target objects, and at least one target object can be generated for each type. The generation rule for a plurality types of large objects may include but are not limited to the generation order, generation quantity, generation time interval, and other rules for the plurality types of target objects.

For example, assuming that the target objects include four types of wild monster models; A, B, C, and D; the generation rule for the plurality of types of target objects may include: sequentially generating 5 A, 2 B, and 1 C in the first interface; then generating 5 A, 3 B, and 1 C sequentially every n seconds; and generating 3 C and 3 D sequentially every m seconds; where n and m are positive numbers.

When determining the current target object to be generated, the motion trajectory parameters can be configured for the current target object to be generated, and each target object to be generated may have different motion trajectory parameters, that is, the motion trajectory of each target object can be non-overlapping.

In these exemplary implementations, by generating a plurality of target objects of different types according to the generation rule, and configuring a motion parameter trajectory for each of the objects, the target objects can be more diverse, and the plurality of target objects can be distributed at different positions in the real scene, which improves the fun and is conducive to improving user interaction experience.

S130, in response to determining that the first control in the first interface aims at the target object, playing a preset animation of the target object.

The first control is displayed at a preset position in the first interface. Moreover, the preset position can be considered as a fixed position in the first interface, such as the center position of the first interface. The first control can be generated when the first interface is started and can be used to aim at the target object. The first control can be, for example, a crosshair control, a circular control, etc.

In this embodiment, the object display apparatus may call the device posture sensing capability provided by the electronic device to sense the posture change of the electronic device. For example, the direction sensor/gyroscope, etc. equipped on the electronic device is called to sense the posture change of the device, such as sensing horizontal rotation/movement and vertical rotation/movement, etc. As the device posture of the electronic device changes, the real scene image presented on the first interface will change, and the area in the first interface aimed by the first control will also change accordingly.

During movement of the target object in the three-dimensional space, the object display apparatus can make a response to that the first control aims at the target object, trigger to play the preset animation of the target object, and the preset animation can be the preset animation of being attacked when the target object is attacked. The interaction between the target object and the user can refer to that by changing the device posture, the user may attack in all directions the target object moving in three-dimensional space. The technical solution of this application realizes interactive interface display and enriches gameplay of the virtual props. In addition, in order to further improve the user's immersive interactive experience, preset sound effects of the target object, such as preset attacked sound effects, can also be played during the process of rendering the preset animation.

The technical solution of the embodiment of the present disclosure presents the collected real scene image on the first interface, and determines the three-dimensional spatial information of the real scene based on the real scene image; configures motion trajectory parameters of a target object according to the three-dimensional spatial information of the real scene, and generates the target object moving in the real scene on the first interface based on the motion trajectory parameters; and in response to determining that a first control in the first interface aims at the target object, plays a preset animation of the target object By configuring the motion trajectory parameters of the target object based on the three-dimensional spatial information of the real scene, the effect of the target object moving in the real scene can be presented on the first interface; by playing the preset animation of the target object when the first control in the first interface aims at the target object, the interactive interface display can be realized, and the gameplay of the virtual props can be enriched more, which can meet user requests to a certain extent.

A plurality of exemplary solutions in the object display method provided in the embodiment of the present disclosure and the above embodiments can be combined. The object display method provided in embodiments of the present disclosure further describes the step of configuring the motion trajectory parameters of the target object. By determining the first area suitable for generating the virtual scene from the real scene and generating the virtual scene at pixel positions corresponding to the first area in the first interface, the combination effect of the real scene and the virtual scene can be better. By configuring the motion trajectory parameters of the target object according to the three-dimensional spatial information corresponding to the second area in the virtual scene, the interaction between the virtual scene and the target object can be increased, for example, presenting display effects such as the appearance and disappearance of the target object from the second area of the virtual scene to prompt the user to pay attention to the second area, which helps to attack the target object when the target object interacts with the second area, thus improving user experience.

In embodiments of the present disclosure, configuring the motion trajectory parameters of the target object based on the three-dimensional spatial information of the real scene, includes: determining first area information according to the three-dimensional spatial information of the real scene, and generating a virtual scene on the first interface based on the first area information; and configuring the motion trajectory parameters of the target object based on three-dimensional spatial information corresponding to a second area in the virtual scene.

The virtual scene can be regarded as a virtual prop used to represent the generation location of the target object, such as a prop in the style of "portal", "wormhole", or "base building", etc., and the virtual scene can be a three-dimensional model or a two-dimensional model. The second area in the virtual scene can be an area surrounded by a plurality of points. For example, assuming that the virtual scene is a portal, the second area can be an area inside a frame of the portal.

During the software application development process, developers may pre-set a first area suitable for rendering the virtual scene, and the first area can be, for example, a plane, a curved surface, or an area where a plurality of planes intersect in the real scene. After determining the three-dimensional spatial information of the plurality of points in the current real scene, the object display apparatus may first configure the generation position parameters of the virtual object according to information characterizing the first area in the three-dimensional spatial information (i.e., the first area information); then, the virtual scene can be rendered in the world coordinate system according to the generation position parameters; finally, the virtual scene can be drawn on the first interface according to the correspondence between the plurality of points in the real scene and pixel points in the interface, so as to generate the virtual scene on the first interface.

During the software application development process, developers may also preset a second area in the virtual scene for interacting with the target object. After the rendering of virtual scene is completed, the three-dimensional spatial information corresponding to the second area in the virtual scene can be determined.

Configuring the motion trajectory parameters of the target object according to the three-dimensional spatial information of the second area may include, for example, configuring at least one parameter of the motion trajectory of the target object as follows according to the three-dimensional spatial information of the second area; a starting point parameter, an endpoint parameter, and a position parameter of any intermediate point. The target object can be displayed at the starting point position and disappear at the endpoint position during moving. By configuring the starting point parameter according to the three-dimensional spatial information corresponding to the second area, the effect of the target object appearing from the second area in the virtual scene can be presented. By configuring the endpoint parameter according to the three-dimensional spatial information corresponding to the second area, the effect of the target object disappearing from the second area in the virtual scene can be presented. By configuring the position parameter of any intermediate point of the trajectory according to the three-dimensional spatial information corresponding to the second area, the effect of the target object resting in the second area during moving can be presented.

In these exemplary implementations, by configuring the motion trajectory parameters of the target object according to the three-dimensional spatial information corresponding to the second area in the virtual scene, the interaction between the virtual scene and the target object can be increased, for example, presenting display effects such as the appearance and disappearance of the target object from the second area of the virtual scene to prompt the user to pay attention to the second area, which helps to attack the target object when the target object interacts with the second area, thus improving user experience.

In some exemplary implementations, the determining first area information according to the three-dimensional spatial information of the real scene, including: in response to determining that the three-dimensional spatial information of the real scene comprises information of a planar area, determining the first area information according to the information of the planar area; or in response to determining that the three-dimensional spatial information of the real scene does not comprise information of the planar area, determining the first area information according to collection position information of the real scene image.

The first area can be a planar area, such as a ground, wall, or desktop. After determining the three-dimensional spatial information of a plurality of points in the current real scene, it may be determined whether the three-dimensional spatial information contains information of the planar area.

Based on the determination that the three-dimensional space information contains information of the plane area, information of a suitable plane can be screened out according to the generation requirements of the virtual scene. For example, an area of the plane is not less than the area of a joint surface between the virtual scene and the plane, and the information of the screened plane is used as the first area information.

Based on the determination that the three-dimensional spatial information does not contain information of the planar area, the first area information can be determined according to collection position information of the real scene image in the world coordinate system (which can be considered as the three-dimensional spatial information of the camera). For example, the three-dimensional spatial information of the orientation position areas adjacent to (such as above, below, left to, right to) the collection position is determined as the first area information. By determining the first area information according to the collection position information, it is possible to present that the virtual object is always displayed in a fixed position of the first interface when the collection position changes, such as the virtual object is fixedly displayed at a center area, upper/lower left corner area, upper/lower right corner area of a certain boundary in the first interface, etc.

In these exemplary implementations, due to the relatively regular planar area, it is not easy to have poor display effects such as virtual object penetration. When the three-dimensional spatial information contains plane information, by presetting the planar area as the first area, the combination effect of the real scene and the virtual scene can be improved. When the three-dimensional spatial information does not contain planar information, the virtual object can be fixed on the interface at least, so that the virtual object can be successfully displayed in different real scenes.

In some exemplary implementations, generating a virtual scene on the first interface based on the first area information, including: configuring generation position parameters of the virtual scene according to the first area information, and playing a generated animation of the virtual scene on the first interface based on the generation position parameters.

The virtual scene can be a virtual scene bound with a generated animation. In the process of generating a virtual object according to the generation position parameters, the generated animation for the virtual object can be played, and the virtual object can be kept at a final position of the animation after the playback of the generated animation is completed. The generated animation of different virtual scenes may not be the same. For example, when the virtual scene is a base building, the generated animation can be an animation of building the building; when the virtual scene is a wormhole, the generated animation can be an animation of spiral enlargement starting from a point, etc. In the first interface, the generated animation of the virtual object in the angle of view for collection can be presented.

In these exemplary implementations, through playing a process of dynamically generating the virtual scene in the first interface, the user can be prompted that the virtual scene is being generated, so that the user is ready to interact with the target object, which can improve the user experience.

Figure 3:
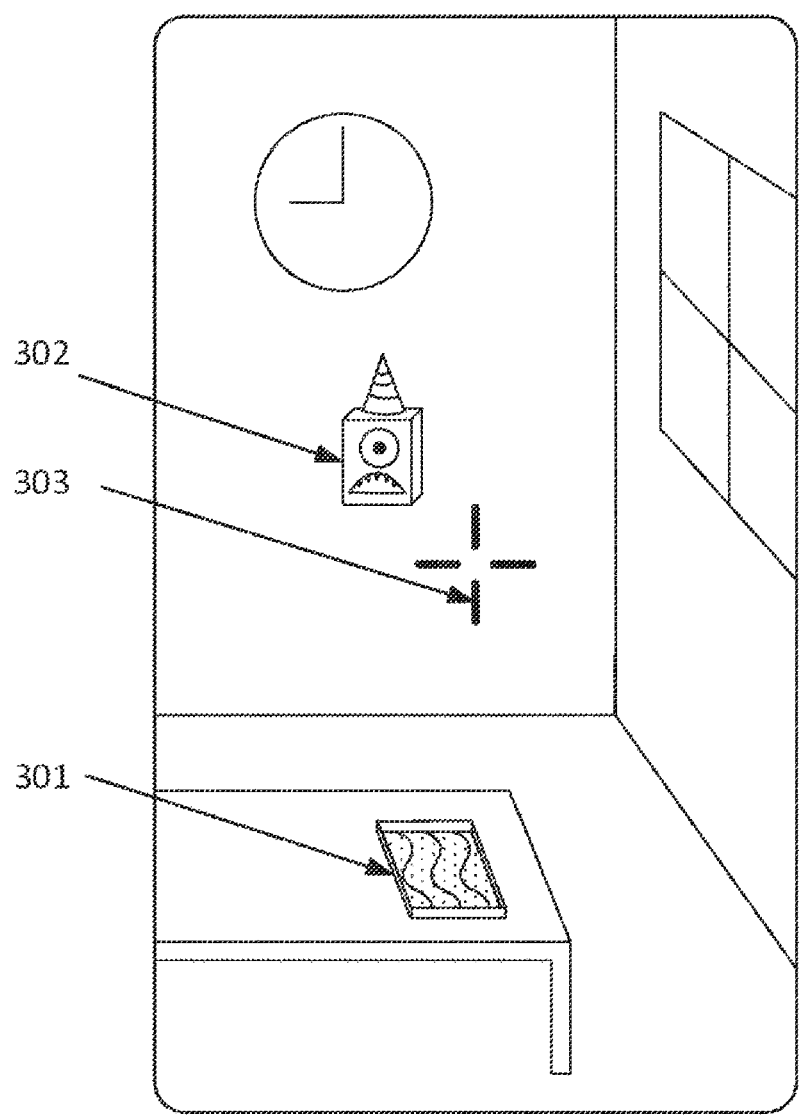
FIG. 3 is an interface schematic diagram of a first interface in an object display method provided by an embodiment of the present disclosure.

As an example, FIG. 3 is an interface schematic diagram of a first interface in an object display method provided by an embodiment of the present disclosure. Referring to FIG. 3, the first interface in FIG. 3 may be a game interface for shooting virtual monsters based on AR technology.

After the first interface in FIG. 3 is started, a countdown control can be triggered. The countdown control can be used to start a countdown for the game, which not only prompts the user that the game is about to start, but also reserves sufficient time for collecting and determining the three-dimensional spatial information of the real scene.

Referring to FIG. 3, the object display apparatus may present the real scene image in full screen in the first interface, where the real scene may include walls, floors, windows, tables, clocks, etc. After the first interface is started, the countdown control can be triggered for countdown, and when the countdown ends, the information characterizing the planar area (the desktop in FIG. 3) in the three-dimensional spatial information of the real scene can be used as the first area information, and a virtual scene 301 (the wormhole model in FIG. 3) can be generated in the first interface based on the first area information. The object display apparatus may also configure the starting point parameter in the motion trajectory parameters of the target object 302 (the wild monster model in FIG. 3) according to the three-dimensional spatial information corresponding to the second area in the virtual scene 301, and generate a target object 302 flying in the real scene in the first interface based on the motion trajectory parameters. The object display apparatus can also be configured to play the preset animation of the target object (such as a preset animation of being attacked), in response to determining that the first control 303 (the crosshair control in FIG. 3) in the first interface aims at the target object.

Through the above object display method, the following pictures can be presented on the game interface; a wormhole model generating at a plane position in the real scene, a wild monster model flying out of the wormhole model, and in response to an operation that user changes the device posture, the crosshair is moved to aim at the monster model to attack the monster model. This realizes interactive interface display and enriches the gameplay of virtual props.

The technical solution of the embodiment of the present disclosure further describes the step of configuring the motion trajectory parameters of the target object. By determining the first area suitable for generating the virtual scene from the real scene, the virtual scene is generated at pixel positions corresponding to the first area in the first interface, the combination effect of the real scene and the virtual scene can be made better. By configuring the motion trajectory parameters of the target object according to the three-dimensional spatial information corresponding to the second area in the virtual scene, the interaction between the virtual scene and the target object can be increased, for example, presenting display effects such as the appearance and disappearance of the target object from the second area of the virtual scene to prompt the user to pay attention to the second area, which helps to attack the target object when the target object interacts with the second area, thus improving user experience.

Further, the object display method provided by the embodiments of the present disclosure provides and the object display method provided in the above embodiments belong to the same disclosed concept, for technical details not described in detail in this embodiment, the above embodiment may be referred to, and the same technical features in these embodiments and the above embodiments have the same beneficial effect.

A plurality of solutions in the object display method provided in the embodiment of the present disclosure and the above embodiments can be combined. The object display method provided in this embodiment further describes steps for interactively rendering the first interface. In a process of rendering the preset animation of the target object, the second control is rendered according to the hit points of the target object updated in real time, which can prompt the user of the hit points of the target object. By updating the hit points of the target object according to different types of tool objects, different props can be used to attack the target object and different attack effects are presented. By playing a disappearance animation of the target object when the hit points of the target object reaches the first preset value, the user can be prompted to stop attacking the target object. By indicating in the interface an orientation of a target object that is not displayed, the user can be assisted in adjusting the first control to aim at the target object not displayed in the current first interface.

Figure 4:
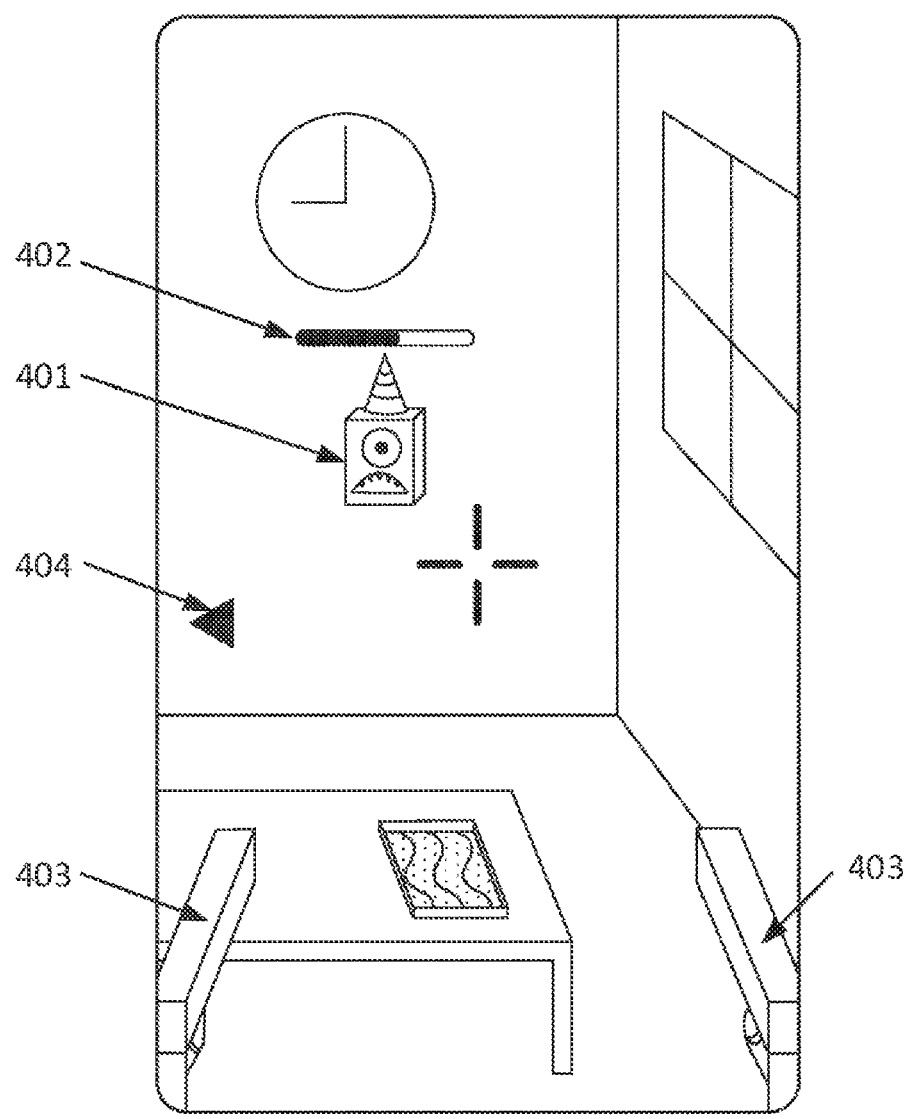
FIG. 4 is an interface schematic diagram of a first interface in an object display method provided by another embodiment of the present disclosure.

As an example, FIG. 4 is an interface schematic diagram of a first interface in an object display method provided by another embodiment of the present disclosure. The first interface in FIG. 4 may also be a game interface for shooting virtual monsters based on AR technology.

Referring to FIG. 4, in some exemplary implementations, in the first interface, a target control 402 (a blood bar control in FIG. 4) configured to characterize the hit points of the target object 401 (a monster model in FIG. 4) is rendered; in the process of rendering the preset animation, it further includes: updating the hit points of the target object, and displaying the second control based on the updated hit points of the target object.

The second control of each target object may be rendered by following the corresponding target object. For example, each second control can always be rendered above the corresponding moving target object.

Updating the hit points of the target object can include reducing the hit points according to the type of the target object. It can be considered that different types of target objects have different degrees of hit point reduction when they are attacked for the same duration. For example, assuming that the target object includes four wild monster models A, B, C, and D, all of which are attacked for 0.5 seconds at full hit points, the remaining hit points of model A can be 0, the remaining hit points of model B can be 50%, the remaining hit points of model C can be 67%, and the remaining hit points of model D can be 75%. In addition, if the first control aims at the target object, after rendering a preset animation for a certain period of time, the hit points of the target object is updated to the remaining a %, when the first control aims at the target object again after moving away, the hit points of the target object can be updated on the basis of a %.

In these exemplary implementations, by rendering the second control based on the hit points of the target object updated in real time, the user can be prompted about the hit points of the target object to improve the interactive experience.

Referring again to FIG. 4, in some exemplary implementations, a tool object 403 (virtual gun in FIG. 4) configured to characterize attack of the target object is also displayed in the first interface; and updating the hit points of the target object, includes: updating the hit points of the target object according to the type of the tool object 403.

In addition to the virtual gun in FIG. 4, the tool object may also include other types of objects, such as bows and arrows, boomerangs, virtual missiles, etc., and the tool object can be a two-dimensional model or a three-dimensional model. When the first control aims at the target object, the first interface may also play an attacking animation of the tool object and/or the attacking sound effect of the tool object. For example, when the tool object is a virtual gun, the attacking animation of the tool object can be animation of firing bullets, and the trajectory of the bullets can be aimed at the target object, and/or the sound effect of firing bullets may also be played.

Updating the hit points of the target object according to the type of tool object can be considered as including: for the same type of target object, when tool objects are of different types (such as the tool object is switched or strengthened and upgraded), the degree of hit point reduction is also different when attacking the target object for the same duration.

For example, assuming that the target object is a D-type monster model, when it is at full hit points, if it is attacked by a normal virtual gun for 0.5 seconds, the remaining hit points can be 75%; if it is attacked by a strengthened virtual gun for 0.5 seconds, the remaining hit points can be 50%. The tool object can be strengthened according to the predetermined game rules (such as random strengthening, or strengthening after the attack duration reaches the preset duration), or type switching can be performed according to the switching instruction input by the user.

In some exemplary implementations, by updating the hit points of the target object according to different types of tool objects, different props can be used to attack the target object and different attack effects are presented.

In addition, in some exemplary implementations, the object display method may further include: playing a message animation of the target object in response to determining that the hit points of the target object has reached a first preset value. In these exemplary implementations, the first preset value can be 0. By playing the animation of disappearance of the target object when the hit points of the target object is 0, it can be prompted that the target object has been eliminated or prompt the user to stop attacking the target object.

Referring to FIG. 4, in some exemplary implementations, it may also include: in response to determining that the target object moves outside the display area of the first interface, displaying an orientation prompt control of the target object according to the motion trajectory parameters of the target object (arrow control in FIG. 4). For example, if the arrow control in FIG. 4 points to the left, it can be considered that on the left side of the real scene presented by the first interface, there is a target object not displayed.

In these exemplary implementations, since the motion trajectory parameters of the target object have been configured, the object display apparatus may obtain the three-dimensional motion positions of the target object in the real scene in real time, so as to covert them to the pixel positions in the first interface. If the converted pixel positions are outside the display area of the first interface, the orientation prompt control can be used to prompt the orientation of the target object according to relationship of the converted pixel positions relative to the display area of the first interface. This can assist the user in adjusting the first control to aim at the target object that is not currently displayed on the first interface.

The technical solution of the embodiment of the present disclosure further describes steps for interactively rendering the first interface. In a process of rendering the preset animation of the target object, the second control is rendered according to the hit points of the target object updated in real time, which can prompt the user of the hit points of the target object. By updating the hit points of the target object according to different types of tool objects, different props can be used to attack the target object and different attack effects are presented. By playing a disappearance animation of the target object when the hit points of the target object reaches the first preset value, the user can be prompted to stop attacking the target object. By indicating in the interface an orientation of a target object that is not displayed, the user can be assisted in adjusting the first control to aim at the target object not displayed in the current first interface.

Further, the object display method provided by the embodiments of the present disclosure provides and the object display method provided in the above embodiments belong to the same disclosed concept, for technical details not described in detail in this embodiment, the above embodiment may be referred to, and the same technical features in these embodiments and the above embodiment have the same beneficial effect.

A plurality of solutions in the object display method provided in the embodiment of the present disclosure and the above embodiments can be combined. The object display method provided in embodiments of the present disclosure describes in detail a step of jumping to the second interface and rendering the second interface. By jumping from the first interface to the second interface under a preset condition and displaying interaction evaluation information in the second interface, evaluation feedback of interactive process can be performed, and thus improving user experience. During the process of attacking the target object, as it may also be attacked by the target object, a tense and exciting interactive atmosphere can be created, and thus improving the user experience. At the same time, the user's game right can be ended when the user's corresponding hit points reach a second preset value, so that game settlement can be performed.

Figure 5:
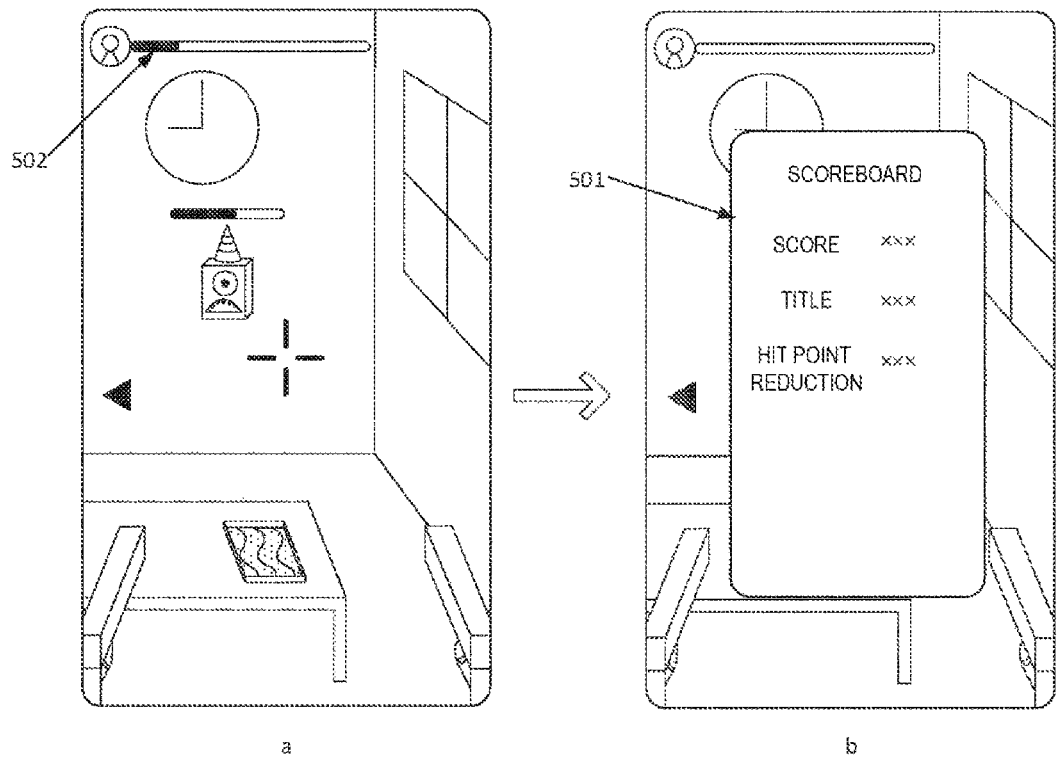
FIG. 5 is a schematic diagram of switching from the first interface to the second interface in an object display method provided by an embodiment of the present disclosure.

As an example, FIG. 5 is a schematic diagram of switching from the first interface to the second interface in an object display method provided in this embodiment. FIG. 5 may include two interfaces a and b, wherein the interface a may represent the first interface, the interface b may represent the second interface. And in FIG. 5, for example, interface a may be an AR shooting game interface, the interface b may be a scoreboard interface for game settlement.

Referring to FIG. 5, in some exemplary implementations, the method further includes: jumping from the first interface (interface a in FIG. 5) to the second interface (interface b in FIG. 5) in response to determining that the current condition meets the preset condition; determining interaction evaluation information based on a playback duration of the preset animation, and displaying an evaluation control 501 in the second interface (interface b in FIG. 5) according to the interaction evaluation information.

When the current condition meets the preset condition, it may include the game duration reaching a preset duration. The game duration may refer to the duration of the life cycle of the first interface from the moment when the countdown of the countdown control in the first interface ends. The preset duration can be set based on experience or experimental values, for example, it can be 30 seconds. In addition, the current condition meeting the preset condition may also include: all target objects are eliminated, and/or the player loses the right to play, etc., which will not be exhaustively listed here.

The interactive evaluation information may include but is not limited to information such as scores and titles. The interactive evaluation information is determined based on the playback duration of the preset animation, which may include: determining a score based on the playback duration of the preset animation for each type of target object, and determining the corresponding title according to the score. The evaluation control, such as 501, can be a text control and can be configured to display interactive evaluation information.

In these exemplary implementations, by jumping from the first interface to the second interface under the preset condition and displaying interaction evaluation information in the second interface, the interaction process can be evaluated and fed back to improve the user experience.

Referring again to FIG. 5, in some exemplary implementations, it further includes: playing the attacking animation of the target object according to a preset rule; in response to determining that the playback of the attacking animation is completed, updating hit points of a player and displaying a third control (the player's blood bar control in the interface a in FIG. 5) based on the updated hit points of the player 502; the current condition meets the preset condition including: the hit points of the player reaching a second preset value.

The target object renders an attacking animation according to a preset rule, which may include: for the target objects of types with attack capabilities, the attacking animations are rendered at a preset time interval. For example, assuming that the target object includes four types of monster models: A, B, C, and D, and only the monster models of types C and D have attack capabilities. After the monster models of types C and D are generated, the attacking animations can be rendered every t seconds, and the attacking animations can be played regardless of whether the monster models of types C and D are displayed in the first interface. The preset rule may also include other rules, such as rendering attacking animations according to the time the target object was attacked, rendering the attacking animations according to the remaining blood amount of the target object, etc., which are not exhaustively listed here.

The hit points of the player can be considered as the hit points of the user. When the rendering of the attacking animation of the target object is completed, it can be considered that the player has been attacked, and the hit points of the player can be updated at this time. Updating the hit points of the player can include reducing the hit points according to the type of target object. It can be considered that the attacking powers of different types of target objects are different, and the degree of hit point reduction of the player can be different when attacked by different types of target objects for the same duration. When updating the remaining hit points of the user, the third control can be rendered based on the updated hit points of the player to prompt to the user his/her own hit points, and thus improving the interactive experience.

In response to determining that the hit points of the player is greater than the second preset value, it can be considered that the user has a game right in this game; in response to determining that the hit points of the player is less than the second preset value, it can be considered that the user has lost the game right in this game. The second preset value can usually be set to 0. When the hit points of the player is reduced to 0, the game right in this game can be lost, and then the second interface is jumped to from the first interface for game settlement.

The technical solution of the embodiment of the present disclosure describes in detail the step of jumping to the second interface and rendering the second interface. The object display method provided in embodiments of the present disclosure describes in detail a step of jumping to the second interface and rendering the second interface. By jumping from the first interface to the second interface under a preset condition and displaying interaction evaluation information in the second interface, evaluation feedback of interactive process can be performed, and thus improving user experience. During the process of attacking the target object, as it may also be attacked by the target object, a tense and exciting interactive atmosphere can be created, and thus improving the user experience. At the same time, the user's game right can be ended when the user's corresponding hit points reaches a second preset value, so that game settlement can be performed.

Further, the object display method provided by the embodiment of the present disclosure and the object display method provided in the above embodiments belong to the same disclosed concept, for the technical details not described in detail in this embodiment, the above embodiment may be referred to, and the same technical features in these embodiments and the above embodiment have the same beneficial effect.

Figure 6:
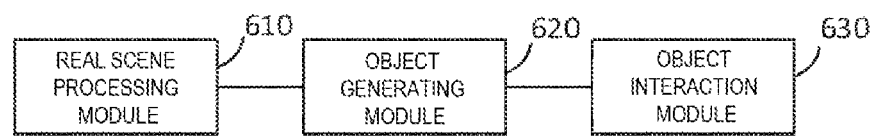
FIG. 6 is a structural schematic diagram of an object display apparatus provided by an embodiment of the present disclosure.

FIG. 6 is a structural schematic diagram of an object display apparatus provided by the embodiment of the present disclosure. The object display apparatus provided by the embodiment of the present disclosure is suitable for rendering interactive props based on the display of real scenes in the interface.

As shown in FIG. 6, embodiments of the present disclosure provide an object display apparatus, including:

a real scene processing module 610 configured to present a collected real scene image on a first interface, and determine three-dimensional spatial information of a real scene based on the real scene image;

an object generating module 620 configured to configure motion trajectory parameters of a target object according to the three-dimensional spatial information of the real scene, and generate the target object moving in the real scene on the first interface based on the motion trajectory parameters; and an object interaction module 630 configured to play a preset animation of the target object in response to determining that the first control in the first interface aims at the target object.

In some exemplary implementations, the object generating module may be configured to:

determine a world coordinate system to which the three-dimensional spatial information of the real scene belongs, and configure the motion trajectory parameters of the target object in the world coordinate system;

determine an angle of view for collection for the real scene image in the world coordinate system; and generate the target object on the first interface according to the angle of view for collection and the motion trajectory parameters; wherein the target object is presented within the first interface with an effect of moving in the real scene.

In some exemplary implementations, the object generating module can also be configured to:

determine first area information according to the three-dimensional spatial information of the real scene, and generate a virtual scene on the first interface based on the first area information; and configure the motion trajectory parameters of the target object based on three-dimensional spatial information corresponding to a second area in the virtual scene.

In some exemplary implementations, the object generating module can also be configured to:

in response to determining that the three-dimensional spatial information of the real scene includes information of a planar area, determine the first area information according to the information of the planar area; and in response to determining that the three-dimensional spatial information of the real scene does not comprise information of the planar area, determine the first area information according to collection position information of the real scene image.

In some exemplary implementations, the object generating module can also be configured to:

configure generation position parameters of the virtual scene according to the first area information, and play generated animation of the virtual scene on the first interface based on the generation position parameters.

In some exemplary implementations, the target object includes at least one type; the object generating module can also be configured to:

determine a current target object to be generated according to a generation law of at least one type of target object, and configure the motion trajectory parameters of the current target object to be generated.

In some exemplary implementations, the first control is displayed at a preset position in the first interface.

In some exemplary implementations, a second control configured to characterize hit points of the target object is displayed in the first interface;

the object interaction module can also be configured to:

in a process of rendering the preset animation, update the hit points of the target object, and display the second control based on the updated hit points of the target object.

In some exemplary implementations, a tool object configured to characterize attack of the target object is displayed in the first interface;

the object interaction module may also be configured to update the hit points of the target object according to the type of the tool object.

In some exemplary implementations, the object interaction module may also be configured to:

when the hit points of the target object reaches a first preset value, play message animation of the target object.

In some exemplary implementations, the object display apparatus may also include:

a prompt control generating module configured to display an orientation prompt control of the target object according to the motion trajectory parameters of the target object, in response to determining that the target object moves outside the display area of the first interface, and display an orientation prompt control of the target object according to the motion trajectory parameters of the target object.

In some exemplary implementations, the object display apparatus may further include:

a second interface display module configured to jump from the first interface to a second interface in response to determining that the current condition meets the preset condition; determine interactive evaluation information according to a playback duration of the preset animation, and display an evaluation control in the second interface according to the interactive evaluation information.

In some exemplary implementations, the object interaction module may also be configured to: play attacking animation of the target object according to the preset rules;

in response to determining that playback of the attacking animation is completed, update hit points of a player and display a third control based on the updated hit points of the player;

the current condition meeting the preset condition includes: the hit points of the player reaching a second preset value.

The object display apparatus provided in the embodiment of the present disclosure may perform any object display method provided in the embodiment, thus having corresponding functional modules for performing the method and beneficial effects.

It shall be noted that the plurality of units and modules included in the above apparatus are only divided according to the functional logic, but the present disclosure is not limited to the above division, any division can be made as long as the corresponding function can be achieved. Further, the specific names of a plurality of functional units are provided only for distinction from each other, but not intended to limit the scope of the embodiment of the present disclosures.

Figure 7:
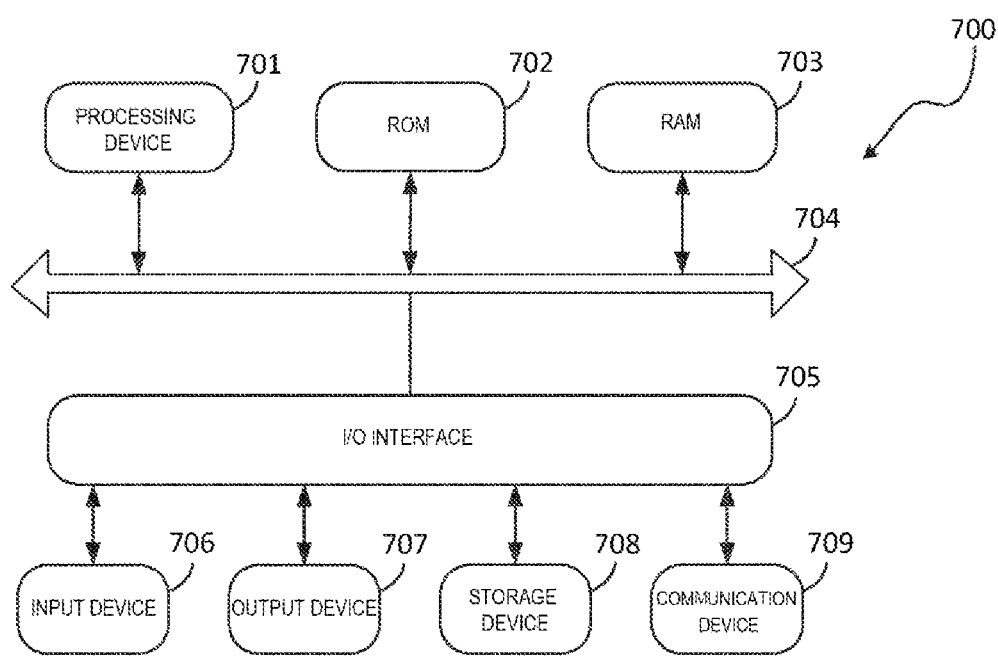
FIG. 7 is a structural schematic diagram of an electronic device provided by an embodiment of the present disclosure.

Referring to FIG. 7 below, it is a structural schematic diagram of an electronic device (such as the terminal device or server in FIG. 7) 700 suitable for implementing the embodiment of the present disclosure. The terminal device in the embodiment of the present disclosure may include but is not limited to mobile terminals such as mobile phones, laptops, digital broadcast receivers, PDAs (Personal Digital Assistants), PADs (tablet computers), PMPs (portable multimedia players), car-mounted terminals (such as car navigation terminals), etc. and fixed terminals such as digital televisions (TV), desktop computers, etc. The electronic device shown in FIG. 7 is only an example and should not bring any limitation on the functionality and scope of use of the embodiment of the present disclosure.

As shown in FIG. 7, the electronic device 700 may include a processing device (such as a central processing unit, graphics processing unit, etc.) 701, which may perform various appropriate actions and processes based on programs stored in Read-Only Memory (ROM) 702 or loaded from storage device 706 into Random Access Memory (RAM) 703. In the RAM 503, various programs and data necessary for the operation of the electronic device 700 are also stored. The processing device 701, ROM 702, and RAM 703 are connected to each other through a bus 704. An Input/Output I/O interface 705 is also connected to the bus 704.

Typically, the following devices can be connected to I/O interface 705; an input device 706 including, for example, touch screens, touchpads, keyboards, mice, cameras, microphones, accelerometers, gyroscopes, etc.; an output device 707 including liquid crystal displays (LCDs), speakers, vibrators, etc.; a storage device 708 including magnetic tapes, hard disks, etc.; and a communication device 709. The communication device 709 may allow the electronic device 700 to communicate with other apparatuses wirelessly or wirelessly to exchange data. Although FIG. 7 shows an electronic device 700 with a plurality of apparatuses, it shall be understood that it is not required to implement or have all of the apparatuses shown. More or fewer apparatuses can be implemented or provided instead.

According to embodiments of the present disclosure, the process described above with reference to the flowchart can be implemented as a computer software program. For example, an embodiment of the present disclosure includes a computer program product that includes a computer program carried on a non-transitory computer-readable medium, where the computer program includes program code for performing the method shown in the flowchart. In such an embodiment, the computer program can be downloaded and installed from a network through the communication device 709, or installed from the storage device 706, or installed from the ROM 702. When the computer program is executed by the processing device 701, the above functions defined in the object display method of the embodiment of the present disclosure are performed.

The electronic device provided in this embodiment of the present disclosure and the object display method provided in the above embodiments belongs to the disclosed idea. Technical details that are not described in detail in this embodiment can be found in the above embodiments, and this embodiment has the same beneficial effect as the above embodiments.

An embodiment of the present disclosure provides a computer storage medium on which a computer program is stored, when being executed by a processor, the program implements the object display method provided in the above embodiments.

It should be noted that the computer-readable medium described above can be a computer-readable signal medium or a computer-readable storage medium, or any combination thereof. The computer-readable storage medium can be, for example, but not limited to, an electrical, magnetic, optical, electromagnetic, infrared, or semiconductor system, apparatus, or device, or any combination thereof. Specific examples of computer-readable storage media may include but are not limited to: an electrical connection with one or more wires, a portable computer disk, a hard disk, random access memory (RAM), read-only memory (ROM), an Erasable Programmable Read-Only Memory (EPROM) or flash memory (FLASH), an optical fiber, a portable compact disk read-only memory (CD-ROM), an optical storage device, a magnetic storage device, or any suitable combination thereof. In the present disclosure, a computer-readable storage medium may be any tangible medium containing or storing a program that can be used by an instruction execution system, apparatus, or device, or can be used in combination with an instruction execution system, apparatus, or device. In the present disclosure, a computer-readable signal medium can include a data signal propagated in baseband or as part of a carrier wave, which carries computer-readable program code therein. Such propagated data signals may take many forms, including but not limited to electromagnetic signals, optical signals, or any suitable combination thereof. A computer-readable signal medium may also be any computer-readable medium other than a computer-readable storage medium, which can send, propagate, or transmit programs for use by or in conjunction with instruction execution systems, apparatus, or devices. The program code contained on the computer-readable medium may be transmitted using any suitable medium, including but not limited to: wires, optical cables, RF (radio frequency), etc., or any suitable combination thereof.

In some embodiments, clients and servers can communicate using any currently known or future developed network protocol such as HTTP (Hyper Text Transfer Protocol), and can be interconnected with any form or medium of digital data communication (such as communication networks). Examples of communication networks include local area networks ("LANs"), wide area networks ("WANs"), internetworks (such as the Internet), and end-to-end networks (such as ad hoc end-to-end networks), as well as any currently known or future developed networks.

The computer-readable medium can be included in the electronic device, or it can exist alone without being assembled into the electronic device.

The above-mentioned computer-readable medium carries one or more programs, and when the above-mentioned one or more programs are executed by the electronic device, the electronic device: presents a collected real scene image on a first interface, and determines three-dimensional spatial information of a real scene based on the real scene image; configures motion trajectory parameters of a target object according to the three-dimensional spatial information of the real scene, and generates the target object moving in the real scene on the first interface based on the motion trajectory parameters; and in response to determining that a first control in the first interface aims at the target object, plays a preset animation of the target object.

Computer program codes for performing the operations of the present disclosure may be written in one or more programming languages or a combination thereof, including but not limited to Object Oriented programming languages—such as Java, Smalltalk, C++, and also conventional procedural programming languages—such as "C" or similar programming languages. The program code may be executed entirely on the user's computer, partially executed on the user's computer, executed as a standalone software package, partially executed on the user's computer and partially on a remote computer, or entirely on a remote computer or server. In the case of involving a remote computer, the remote computer may be any kind of network—including local area network (LAN) or wide area network (WAN)—connected to the user's computer, or may be connected to an external computer (e.g., through an Internet service provider to connect via the Internet).

The flowcharts and block diagrams in the accompanying drawings illustrate the architecture, functions, and operations of possible implementations of the system, method, and computer program product according to various embodiments of the present disclosure. In this regard, each block in a flowchart or block diagram may represent a module, program segment, or portion of code that contains one or more executable instructions for implementing a specified logical function. It should also be noted that in some alternative implementations, the functions marked in the blocks may occur in a different order than those marked in the drawings. For example, two consecutive blocks may actually be executed in parallel, or they may sometimes be executed in reverse order, depending on the function involved. It should also be noted that each block in the block diagrams and/or flowcharts, as well as combinations of blocks in the block diagrams and/or flowcharts, may be implemented using a dedicated hardware-based system that performs the specified function or operations, or may be implemented using a combination of dedicated hardware and computer instructions.

The units described in the embodiments of the present disclosure may be implemented by means of software or hardware, and the name of the unit does not constitute a limitation on the unit itself in a certain case, for example, a first obtaining unit may also be described as "a unit for obtaining at least two internet protocol addresses".

The functions described herein above can be performed at least in part by one or more hardware logic components. For example, without limitation, exemplary types of hardware logic components that may be used include: Field Programmable Gate Arrays (FPGAs), Application Specific Integrated Circuits (ASICs), Application Specific Standard Parts (ASSPs), System on Chip (SOCs), Complex Programmable Logic Devices (CPLDs), and so on.

In the context of this disclosure, a machine-readable medium can be a tangible medium that may contain or store programs for use by or in conjunction with instruction execution systems, apparatuses, or devices. A machine-readable medium may be a machine-readable signal medium or a machine-readable storage medium. A machine-readable medium may include, but are not limited to, electronic, magnetic, optical, electromagnetic, infrared, or semiconductor systems, apparatuses, or devices, or any suitable combination thereof. Specific examples of the machine-readable storage medium may include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination thereof.

According to one or more embodiments of the present disclosure, [Example 1] provides a method for displaying an object, including:

presenting a collected real scene image on a first interface, and determining three-dimensional spatial information of a real scene based on the real scene image;

configuring motion trajectory parameters of a target object according to the three-dimensional spatial information of the real scene, and generating the target object moving in the real scene on the first interface based on the motion trajectory parameters; and in response to determining that a first control in the first interface aims at the target object, playing a preset animation of the target object.

According to one or more embodiments of the present disclosure, [Example 2] provides a method for displaying an object, further including:

In some exemplary implementations, the configuring motion trajectory parameters of a target object according to the three-dimensional spatial information of the real scene, and generating the target object moving in the real scene on the first interface based on the motion trajectory parameters, including:

determining a world coordinate system to which the three-dimensional spatial information of the real scene belongs, and configuring the motion trajectory parameters of the target object in the world coordinate system;

determining a angle of view for collection for the real scene image in the world coordinate system; and generating the target object on the first interface according to the angle of view for collection and the motion trajectory parameters; wherein t target object is presented within the first interface with an effect of moving in the real scene.

According to one or more embodiments of the present disclosure, [Example 3] provides a method for displaying an object, further including:

In some exemplary implementations, the configuring motion trajectory parameters of a target object according to the three-dimensional spatial information of the real scene, including:

determining first area information according to the three-dimensional spatial information of the real scene, and generating a virtual scene on the first interface based on the first area information; and configuring the motion trajectory parameters of the target object based on three-dimensional spatial information corresponding to a second area in the virtual scene.

According to one or more embodiments of the present disclosure, [Example 4] provides a method for displaying an object, further including:

In some exemplary implementations, the determining first area information according to the three-dimensional spatial information of the real scene, including:

in response to determining that the three-dimensional spatial information of the real scene comprises information of a planar area, determining the first area information according to the information of the planar area; or in response to determining that the three-dimensional spatial information of the real scene does not comprise information of the planar area, determining the first area information according to collection position information of the real scene image.

According to one or more embodiments of the present disclosure, [Example 5] provides a method for displaying an object, further including:

In some example implementations, the generating a virtual scene on the first interface based on the first area information, including:

configuring generation position parameters of the virtual scene according to the first area information, and playing generated animation of the virtual scene on the first interface based on the generation position parameters.

According to one or more embodiments of the present disclosure, [Example 6] provides a method for displaying an object, further including:

In some implementation methods of examples, the target object includes at least one type; the motion trajectory parameters of the configured target object include:

the target object comprises at least one type; and the configuring motion trajectory parameters of a target object includes:

determining a current target object to be generated according to a generation law of at least one type of target object, and configuring the motion trajectory parameters of the current target object to be generated.

According to one or more embodiments of the present disclosure, [Example 7] provides a method for displaying an object, further including:

In some implementation methods, the first control is displayed at a preset position in the first interface.

According to one or more embodiments of the present disclosure, [Example 8] provides a method for displaying an object, further including:

In some example implementations, a second control configured to characterize hit points of the target object is displayed in the first interface;

during playing the preset animation of the target object, the method further includes:

updating the hit points of the target object, and displaying the second control based on the updated hit points of the target object.

According to one or more embodiments of the present disclosure, [Example 9] provides a method for displaying an object, further including:

In some implementation methods of examples, a tool object configured to characterize attack of the target object is displayed in the first interface;

the updating the hit points of the target object includes: updating the hit points of the target object according to the type of the tool object.

According to one or more embodiments of the present disclosure, [Example 10] provides a method for displaying an object, further including:

In some exemplary implementations, when the hit points of the target object reaches a first preset value, playing a message animation of the target object.

According to one or more embodiments of the present disclosure, [Example 11] provides a method for displaying an object, further including:

In some exemplary implementations, in response to determining that the target object moves outside the display area of the first interface, displaying an orientation prompt control of the target object according to the motion trajectory parameters of the target object.

According to one or more embodiments of the present disclosure, [Example 12] provides a method for displaying an object, further including:

In some exemplary implementations, in response to determining that a current condition meets the preset condition, jumping from the first interface to a second interface;

determining interactive evaluation information according to a playback duration of the preset animation, and displaying an evaluation control in the second interface according to the interactive evaluation information.

According to one or more embodiments of the present disclosure, [Example 13] a method for displaying an object, further including:

In some exemplary implementations, playing attacking animation of the target object according to a preset rule;

in response to determining that playback of the attacking animation is completed, updating hit points of a player and displaying a third control based on the updated hit points of the player; and the current condition meeting a preset condition including: the hit points of the player reaching a second preset value.

The above description is only embodiments of this disclosure and an explanation of the technical principles used. Those skilled in the art should understand that the scope of the disclosure involved in this disclosure is not limited to technical solutions composed of specific combinations of the above technical features, but should also covers other technical solutions formed by arbitrary combinations of the above technical features or their equivalent features without departing from the above disclosure concept. For example, technical solutions formed by replacing the above features with (but not limited to) technical features with similar functions disclosed in this disclosure.

In addition, although a plurality of operations are depicted in a specific order, this should not be understood as requiring these operations to be performed in the specific order shown or in a sequential order. In certain environments, multitasking and parallel processing may be advantageous. Similarly, although a plurality of implementation details are included in the above discussion, these should not be construed as limiting the scope of the present disclosure. Some features described in the context of individual embodiments can also be implemented in combination in a single embodiment. Conversely, a plurality of features described in the context of a single embodiment can also be implemented in a plurality of embodiments separately or in any suitable sub-combination.

Although the subject matter has been described in language specific to structural features and/or methodological logical actions, it should be understood that the subject matter defined in the appended claims is not necessarily limited to the specific features or actions described above. On the contrary, the specific features and actions described above are merely example forms of implementing the claims.

We claim:

1. A method for displaying an object, comprising:
presenting a real scene image on a first interface, and determining three-dimensional spatial information of a real scene based on the real scene image;
generating a virtual scene based on the three-dimensional spatial information of the real scene;
displaying the virtual scene in the first interface;
configuring motion trajectory parameters of a target object based on information associated with the virtual scene;

moving, in the first interface, the target object relative to the virtual scene based on the motion trajectory parameters;

displaying a first control in the first interface;

in response to determining that the first control in the first interface aims at the target object, playing a preset animation of the target object;

playing attacking animation of the target object according to a preset rule;

in response to determining that playback of the attacking animation is completed, updating hit points of a player and displaying a third control based on the hit points of the player; and in response to determining that the hit points of the player reach a second preset value, jumping from the first interface to a second interface.

2. The method of claim 1, wherein the configuring motion trajectory parameters of a target object based on the three-dimensional spatial information of the real scene, and generating the target object moving in the real scene on the first interface based on the motion trajectory parameters comprising:

determining a world coordinate system to which the three-dimensional spatial information of the real scene belongs, and configuring the motion trajectory parameters of the target object in the world coordinate system;

determining an angle of view for collection of the real scene image in the world coordinate system; and generating the target object on the first interface based on the angle of view for collection and the motion trajectory parameters; wherein the target object is presented within the first interface with an effect of moving in the real scene.

3. The method of claim 1, wherein the configuring motion trajectory parameters of a target object based on the three-dimensional spatial information of the real scene, comprising:

determining first area information based on the three-dimensional spatial information of the real scene, and generating a virtual scene on the first interface based on the first area information; and configuring the motion trajectory parameters of the target object based on three-dimensional spatial information corresponding to a second area in the virtual scene.

4. The method of claim 3, wherein the determining first area information based on the three-dimensional spatial information of the real scene comprising:

in response to determining that the three-dimensional spatial information of the real scene comprises information of a planar area, determining the first area information based on the information of the planar area; or in response to determining that the three-dimensional spatial information of the real scene does not comprise information of the planar area, determining the first area information based on collection position information of the real scene image.

5. The method of claim 3, wherein the generating a virtual scene on the first interface based on the first area information, comprising:

configuring generation position parameters of the virtual scene based on the first area information, and playing generated animation of the virtual scene on the first interface based on the generation position parameters.

6. The method of claim 1, wherein the target object comprises at least one type; and the configuring motion trajectory parameters of a target object comprises:

determining a current target object to be generated according to a generation rule of at least one type of the target object, and configuring the motion trajectory parameters of the current target object to be generated.

7. The method of claim 1, wherein the first control is displayed at a preset position in the first interface.

8. The method of claim 1, wherein a second control configured to characterize hit points of the target object is displayed in the first interface;

during playing the preset animation of the target object, the method further comprises:

updating the hit points of the target object, and displaying the second control based on the updated hit points of the target object.

9. The method of claim 8, wherein a tool object configured to characterize attack of the target object is displayed in the first interface;

the updating the hit points of the target object comprises:

updating the hit points of the target object based on the type of the tool object.

10. The method of claim 8, further comprising:

in response to determining that the hit points of the target object reaches a first preset value, playing a message animation of the target object.

11. The method of claim 1, further comprising:

in response to determining that the target object moves outside a display area of the first interface, displaying an orientation prompt control of the target object based on the motion trajectory parameters of the target object.

12. The method of claim 1, further comprising:

determining interactive evaluation information based on a playback duration of the preset animation, and displaying an evaluation control in the second interface based on the interactive evaluation information.

13. An electronic device comprising:

one or more processors; and a storage apparatus configured to store one or more programs, the one or more programs, when executed by the one or more processors, causing the one or more processors to implement a method for displaying an object comprising:

presenting a real scene image on a first interface, and determining three-dimensional spatial information of a real scene based on the real scene image;

generating a virtual scene based on the three-dimensional spatial information of the real scene;

displaying the virtual scene in the first interface;

configuring motion trajectory parameters of a target object based on information associated with the virtual;

moving, in the first interface, the target object relative to the virtual scene based on the motion trajectory parameters;

displaying a first control in the first interface;

in response to determining that the first control in the first interface aims at the target object, playing a preset animation of the target object;

playing attacking animation of the target object according to a preset rule;

in response to determining that playback of the attacking animation is completed, updating hit points of a player and displaying a third control based on the hit points of the player; and in response to determining that the hit points of the player reach a second preset value, jumping from the first interface to a second interface.

14. The electronic device of claim 13, wherein the configuring motion trajectory parameters of a target object based on the three-dimensional spatial information of the real scene, and generating the target object moving in the real scene on the first interface based on the motion trajectory parameters comprising:
determining a world coordinate system to which the three-dimensional spatial information of the real scene belongs, and configuring the motion trajectory parameters of the target object in the world coordinate system;
determining an angle of view for collection of the real scene image in the world coordinate system; and
generating the target object on the first interface based on the angle of view for collection and the motion trajectory parameters; wherein the target object is presented within the first interface with an effect of moving in the real scene.

15. The electronic device of claim 13, wherein the configuring motion trajectory parameters of a target object based on the three-dimensional spatial information of the real scene, comprising:
determining first area information based on the three-dimensional spatial information of the real scene, and generating a virtual scene on the first interface based on the first area information; and
configuring the motion trajectory parameters of the target object based on three-dimensional spatial information corresponding to a second area in the virtual scene.

16. The electronic device of claim 15, wherein the determining first area information based on the three-dimensional spatial of the real scene comprising:
in response to determining that the three-dimensional spatial information of the real scene comprises information of a planar area, determining the first area information based on the information of the planar area; or
in response to determining that the three-dimensional spatial information of the real scene does not comprise information of the planar area, determining the first area information based on collection position information of the real scene image.

17. The electronic device of claim 15, wherein the generating a virtual scene on the first interface based on the first area information, comprising:
configuring generation position parameters of the virtual scene based on the first area information, and playing generated animation of the virtual scene on the first interface based on the generation position parameters.

18. The electronic device of claim 13, wherein the target object comprises at least one type; and the configuring motion trajectory parameters of a target object comprises:
determining a current target object to be generated according to a generation rule of at least one type of the target object, and configuring the motion trajectory parameters of the current target object to be generated.

19. A non-transitory storage medium comprising computer-executable instructions which, when executed by a computer processor, cause a method for displaying an object comprising:
presenting a real scene image on a first interface, and determining three-dimensional spatial information of a real scene based on the real scene image;
generating a virtual scene based on the three-dimensional spatial information of the real scene;
displaying the virtual scene in the first interface;
configuring motion trajectory parameters of a target object based on information associated with the virtual scene;
moving, in the first interface, the target object relative to the virtual scene based on the motion trajectory parameters;
displaying a first control in the first interface;
in response to determining that the first control in the first interface aims at the target object, playing a preset animation of the target object;
playing attacking animation of the target object according to a preset rule;
in response to determining that playback of the attacking animation is completed, updating hit points of a player and displaying a third control based on the hit points of the player; and
in response to determining that the hit points of the player reach a second preset value, jumping from the first interface to a second interface.

* * * * *